Feb. 18, 1958   N. G. JOHNSON ET AL   2,823,609
DEVICE FOR SEISMIC PROSPECTING
Original Filed April 15, 1953

INVENTORS
NORMAN GARDNER JOHNSON
GEORGE ADELBERT NODDIN
MERRILL EDWARD SWANSON
BY
*Thos. A. Wilson*
ATTORNEY

2,823,609

DEVICE FOR SEISMIC PROSPECTING

Norman Gardner Johnson, Wilmington, Del., and George Adelbert Noddin, Sewell, and Merrill Edward Swanson, Pitman, N. J., assignors to E. I. du Pont de Nemours and Company, Wilmington, Del., a corporation of Delaware Original application April 15, 1953, Serial No. 348,895. Divided and this application May 24, 1956, Serial No. 587,022

4 Claims. (Cl. 102—27)

The present invention relates to an improved method of seismic prospecting and to a device particularly adapted for use in this method. This application is a division of our co-pending application Serial No. 348,895 filed April 15, 1953.

For many years, large areas have been systematically investigated and the underground formations charted by seismic survey groups. During the course of those surveys, many methods have been proposed and tried in an effort both to increase the accuracy and readability of the records obtained and to decrease the cost of the exploration, with only partial success.

The basic theory followed in seismic surveying is that vibration waves travel at different velocities through different strata of earth, and are reflected or refracted by these different strata. Explosives are extensively used to produce earth vibration, and the waves thus produced when reflected or refracted back to the surface by the underlying strata are recorded on sensitive recording instruments. The two methods mainly used are the reflection method, wherein the recording instruments are located relatively close to the blast zone, and record the waves reflected by the underlying horizons, and the refraction method, wherein the recording instruments are positioned up to five miles away from the blast zone, and record the waves refracted along the underlying strata. In either method, there is a minimum amount of earth vibration below which the recording instruments cannot detect the reflected or refracted waves, and, therefore, the amount and strength of explosive used to produce the earth vibration cannot be reduced below certain limits. Also, in either method, undesirable or random waves directly from the source of energy are produced, and these waves tend to obscure the reflected or refracted waves. The strength and amplitude of the random waves increase with increased energy at the source, thus setting an upper limit on the explosive used.

In an abstract of a progress report published in Volume XV, Number 2, p. 208–218, of Geophysics, the author describes a method of seismic prospecting wherein a number of charges are spaced apart a sufficient distance to prevent sympathetic detonation, and are set off progressively to form a single shot. The delay between the detonation of each charge is produced by regulating the length of detonating fuse (Primacord) used to connect the charges. The theory behind this method is that when the charges are detonated at such times that the rate of propagation from one charge to the next is approximately equal to the seismic velocity of the surrounding medium, the waves produced by the detonation going in the direction of the reflecting or refracting horizon are "in phase," and thus reinforce each other, while the random waves are "out of phase" and are thus weakened. The author was unable to obtain desirable data for rates of propagation below 10,000 feet per second where the charges were loaded in a single borehole because of the practical limit as to the amount of Primacord which can be introduced between the charges, and the author also found that commercially available electric delay blasting caps had delay periods too long and too inaccurate for these purposes.

It is an object of the present invention to provide a device particularly adapted for use in a method for producing earth vibrations by a plurality of explosive charges fired progressively as a single shot. Additional objects will become apparent as the invention is further described.

The method in which the device of the present invention is used for producing earth vibrations for seismic prospecting, as described in our co-pending application Serial No. 348,895, is equally applicable to either refraction procedure or reflection procedure, and comprises positioning a plurality of high strength detonating explosive charges a sufficient distance apart so that adjacent charges will not be detonated by the shock wave from the preceding charge, known as detonation by influence, or sympathetic detonation, connecting each charge in sequence with detonating fuse, and interposing in each length of detonating fuse at least one delay connector having a precise delay period of from 0.5 to 5 milliseconds. The first charge will preferably be detonated by an electric blasting cap, and the remaining charges will then be detonated in sequence by the detonating fuse, the interval between the detonation of each charge being determined by the amount of detonating fuse between each charge, the delay period of the connector or connectors, and the number of delay connectors.

A highly precise delay connector in accordance with this invention having the desired delay periods can be prepared by providing a tubular shell having an inner diameter substantially equal to the outer diameter of detonating fuse with a centrally positioned delay producing unit, this unit comprising in sequence an enclosed explosive priming charge, an encapsulated exothermic non-explosive mixture, an empty lead tube, an air gap, and an enclosed heat-sensitive detonating mixture. The shell will have sufficient length so that an end of a length of detonating fuse can be inserted at either side of the delay unit.

In order to more full describe the present invention, reference is made to the accompanying drawings, which illustrate specific embodiments of the invention. It will be understood that the invention is not limited to the embodiments illustrated in these drawings.

Figure 1:
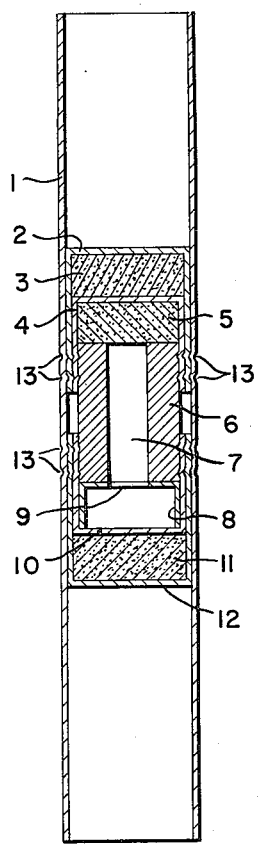
Figure 1 is a sectional view of a delay connector assembly.

Referring in greater detail to the drawings, 1 is a tubular shell, for example, of gilding metal, 2 is a primer shell fitting snugly within shell 1, 3 is a priming composition, for example, lead azide, and 4 is a capsule fitting inside the priming shell 2. 5 is an exothermic non-explosive mixture encapsulated by capsule 4. 6 is a length of empty lead tubing having a central passageway 7. Adjacent to tubing 6 at the end opposite the exothermic mixture 5 is an air gap formed by spacer capsule 8 having aperture 9. Capsule 8 is enclosed within shell 10, the base of which is adjacent to the heat-sensitive detonating explosive composition 11 which is enclosed in shell 12. All of the foregoing elements are fixed in position by means of the peripheral crimps 13.

Figure 2:
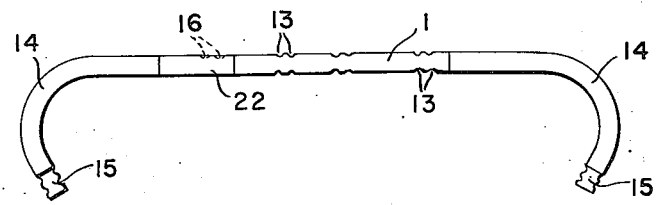
Figure 2 is a plan view of a preferred embodiment of the present device.

In Figure 2, tubular shell 1 containing the delay elements described above has inserted in each end an end of detonating fuse 14, the joint being made firm by means of peripheral crimps 16. Preferably, the joint is covered with a water-proof tape 22 to make the unit water-tight. The remaining ends of the short lengths of detonating fuse 14 are enclosed in caps 15 to seal in the explosive, and to waterproof the detonating fuse.

The operation of the delay connector of the present invention is as follows: When the detonation from a length of detonating fuse 14, reaches the base of shell 2, the priming charge 3 contained therein is initiated, and in turn ignites the exothermic non-explosive mixture 5. This mixture burns rapidly, and squirts hot particles of slag through the passageway 7 of lead tube 6 and through aperture 9 to the air gap formed within spacer capsule 8. As these particles impinge on the base of shell 10, the heat is transmitted thereby to the heat-sensitive detonating explosive composition 11. When the temperature reaches the ignition temperature of composition 11, it detonates with sufficient strength to initiate the detonating fuse adjacent to the base of shell 12.

Two elements of the above assembly are not essential to the operation, but are present to increase the reliability and accuracy of the device. The priming charge 3 and shell 2 may be eliminated, and the exothermic mixture 5 ignited directly by the detonating fuse 14. The spacer capsule 8 is present merely to insure the maintenance of the essential air space between the lead tube 6 and the base of shell 10. Obviously, the arrangement illustrated can be varied by using small completely enclosed capsules in lieu of shells fitting inside of each other to provide essentially the same conditions with respect to enclosing the various compositions. In the preferred embodiment illustrated in Figure 2, the device can be easily and rapidly connected in the field without special tools, since all that must be done to connect the connector in a line of detonating fuse is to sever the line and tape each of the ends thus formed to one of the short lengths of detonating fuse 14. It may be desirable to paint one end, or otherwise mark one end, to indicate the end which should be attached toward the charge first initiated.

As a priming composition for use in the present invention, lead azide is preferred. However, any of the well known priming compositions, such as mercury fulminate, diazodinitrophenol and the like, may be used. The exothermic mixture must be a non-explosive mixture which burns with only a slight evolution of gas and produces considerable quantities of heat. Such mixture is obtained by mixing together in selected proportions solid oxidizing agents and solid metallic reducing agents. Examples of suitable mixtures are: (1) magnesium, barium peroxide and selenium; (2) aluminum, ferric oxide and lead oxide; (3) magnesium, barium peroxide and potassium perchlorate; (4) boron and lead peroxide. A preferred mixture is magnesium, barium peroxide and selenium in ratios of 30/35/35; 36/32/32 or 40/35/25, all of which function extremely well.

The heat-sensitive detonating explosive composition 11 will preferably be a mixture such as a 90/10 mixture of lead azide and tetrazene. Another suitable mixture is aluminum, tetrazene and mannitol hexanitrate. Compounds such as mercury fulminate and diazodinitrophenol may also be used. If desired, the charge may consist of a detonating charge and a thin layer of a heat-sensitive mixture adjacent to the air space.

The period of delay can be varied by changing the compositions, the length of the lead tube or the air gap, or by varying the thickness of the metal between the heat-sensitive composition and the air space. The latter means of controlling the delay period is preferred, since it requires a minimum change in manfacturing and assembly. The following examples illustrate the high accuracy of the present delay connector, and also the effect of varying the thickness of the metal above the heat-sensitive composition.

*Example I*

A number of delay connectors were prepared in the form illustrated in Figure 1, using 6½ grains of lead azide as priming charge 2, 1½ grains of a 30/35/35 mixture of magnesium, barium peroxide and selenium as the exothermic mixture 5, and 6 grains of a 90/10 mixture of lead azide and tetrazine as the heat-sensitive charge 11. The connector shell 1 had a length of 2.75 inches and an inside diameter of 0.236 inch. The lead tube was 1½₂ inches in length, and the air gap had a length of $5/32$ inch. The thickness of the base of shell 10 was 0.030 inch. A 12-inch length of Primacord was attached to each end of the connector, the overall length of the assembly being slightly over 26 inches.

The devices were tested and the average delay period was 2.1 milliseconds, the maximum delay period being 2.3 milliseconds and the minimum period being 2.0 milliseconds.

*Example II*

A second series of delay connectors identical with those described in Example I, except that the thickness of the base of shell 10 was reduced to 0.018 inch, were prepared and tested. The average delay period was 0.99 millisecond, the maximum delay period being 1.10 milliseconds and the minimum being 0.86 millisecond.

By increasing the thickness of the base of shell 10 to about 0.035 inch, an average delay period of 3.2 milliseconds can be obtained with an otherwise identical delay connector.

The delay connectors described herein may also be used in other applications such as, for example, in water well cleaning by the method described by E. M. Ebaugh in Waterworks Association Journal, 42, 171–185 (1950), February, or with other methods of seismic prospecting, and the like.

The invention has been described in detail in the foregoing. Obviously, many variations and modifications may be used without departing from the spirit thereof. We wish, therefore, to be limited only by the following claims.

We claim:

1. A delay connector for connecting two lengths of detonating fuse which comprises a tubular shell having an inner diameter substantially equal to the outer diameter of detonating fuse, and centrally positioned within said tubular shell a delay-producing unit comprising in sequence, an enclosed explosive priming charge, an encapsulated exothermic non-explosive mixture, an empty lead tube, an air gap and an enclosed heat-sensitive detonating explosive composition, said tubular shell being of greater length than the length of said delay producing unit.

2. A delay connector as claimed in claim 1, wherein said air gap is formed by an empty capsule having a central perforation adjacent to said lead tube.

3. A delay connector as claimed in claim 1, wherein a short length of detonating fuse is inserted and crimped into both ends of said tubular shell.

4. A delay connector for connecting two lengths of detonating fuse which comprises a tubular metallic shell having an inner diameter substantially equal to the outer diameter of detonating fuse, and centrally positioned within said tubular shell a delay-producing unit comprising in sequence an enclosed charge of lead azide, an encapsulated mixture of magnesium, selenium and barium peroxide, an empty lead tube, an encapsulated air gap, and an enclosed charge of a mixture of lead azide and tetrazine, wherein said tubular shell is of greater length than the length of said delay producing unit.

References Cited in the file of this patent

UNITED STATES PATENTS

| 1,599,078 | Corrie | Sept. 7, 1926 |
| 2,618,221 | Lowe | Nov. 18, 1952 |
| 2,736,263 | Lewis et al. | Feb. 28, 1956 |

FOREIGN PATENTS

| 582,420 | Great Britain | Nov. 15, 1946 |